(12) United States Patent
Denny et al.

(10) Patent No.: US 10,692,192 B2
(45) Date of Patent: Jun. 23, 2020

(54) METHOD FOR PROVIDING IMAGE DATA FROM A CAMERA SYSTEM, CAMERA SYSTEM AND MOTOR VEHICLE

(71) Applicant: Connaught Electronics Ltd., Tuam, County Galway (IE)

(72) Inventors: Patrick Eoghan Denny, Roscam (IE); Brian Michael Thomas Deegan, Galway (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 211 days.

(21) Appl. No.: 15/520,659

(22) PCT Filed: Oct. 20, 2015

(86) PCT No.: PCT/EP2015/074227
§ 371 (c)(1),
(2) Date: Apr. 20, 2017

(87) PCT Pub. No.: WO2016/062699
PCT Pub. Date: Apr. 28, 2016

(65) Prior Publication Data
US 2017/0308999 A1      Oct. 26, 2017

(30) Foreign Application Priority Data

Oct. 21, 2014    (DE) .................. 10 2014 115 292

(51) Int. Cl.
| | | |
|---|---|---|
| *G06K 9/00* | (2006.01) | |
| *G06T 5/00* | (2006.01) | |
| *H04N 5/225* | (2006.01) | |

(52) U.S. Cl.
CPC ............... *G06T 5/003* (2013.01); *G06T 5/00* (2013.01); *H04N 5/2254* (2013.01);
(Continued)

(58) Field of Classification Search
None
See application file for complete search history.

(56) References Cited

U.S. PATENT DOCUMENTS 6,778,769 B2 *  8/2004  Motomura ............. G03B 15/05
                                                                      396/158
7,607,509 B2 * 10/2009  Schmiz ............. B60R 21/01538
                                                                      180/274
(Continued)

FOREIGN PATENT DOCUMENTS

CN           103218792 A  *  7/2013
DE      102012105434 A1  * 12/2013 ........... H04N 5/2254
(Continued)

OTHER PUBLICATIONS

International Search Report issued in PCT/EP2015/074227 dated Jul. 15, 2016 (4 pages).
(Continued)

*Primary Examiner* — Jayesh A Patel
(74) *Attorney, Agent, or Firm* — Osha Liang LLP

(57) ABSTRACT

The invention relates to a method for providing image data (24) from a camera system (3) for a motor vehicle (1), wherein the camera system (3) includes at least one camera, in particular a plenoptic camera (4), including a lens (6) and a sensor array (7), in which electromagnetic radiation (15, 17, 19, 21) is captured by means of the sensor array (7) and image data (24) of an environmental region (11) of the motor vehicle (1) is provided based on the captured electromagnetic radiation (15, 17, 19, 21) and the image data (24) is evaluated by means of an evaluation device (5), wherein a direction of incidence of the electromagnetic radiation (15, 17, 19, 21) on the sensor array (7) is determined by the evaluation device (5) based on the image data (24) provided by the sensor array (7) and the image data (24) is adapted by
(Continued)

Figure 1:
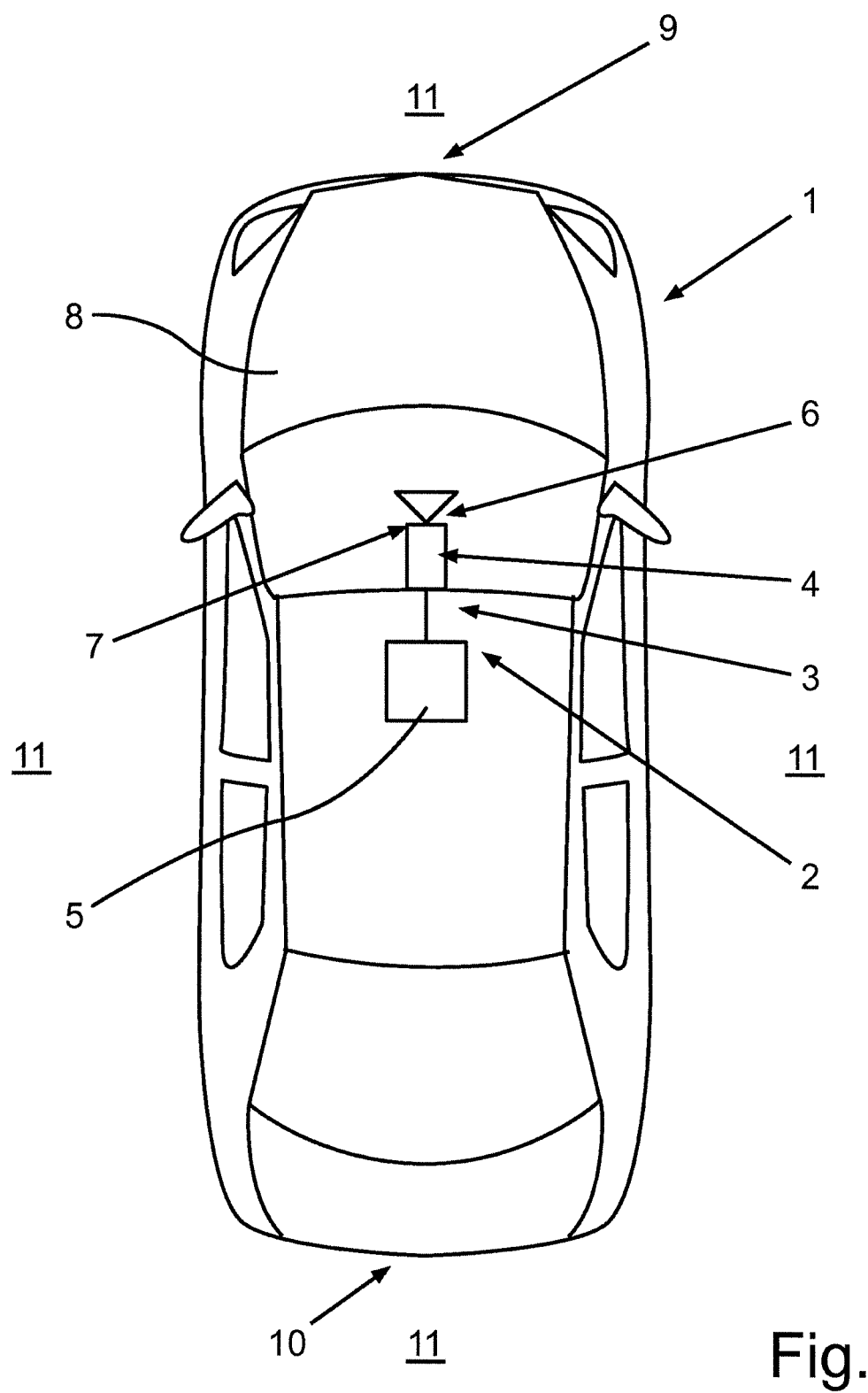

means of the evaluation device (5) depending on the determined direction of incidence.

12 Claims, 3 Drawing Sheets

(52) U.S. Cl.
CPC . *H04N 5/2258* (2013.01); *G06T 2207/10052* (2013.01); *G06T 2207/20016* (2013.01); *G06T 2207/30252* (2013.01)

(56) References Cited

U.S. PATENT DOCUMENTS

| | | | | |
|---|---|---|---|---|
| 7,767,964 B2* | 8/2010 | Nakata | ................ | H04N 5/2354 250/330 |
| 8,159,568 B2* | 4/2012 | Ahdoot | ................... | H04N 5/33 250/252.1 |
| 8,290,358 B1* | 10/2012 | Georgiev | ............... | G03B 35/10 396/326 |
| 8,427,548 B2* | 4/2013 | Lim | ................... | H04N 5/23212 348/222.1 |
| 8,515,196 B1* | 8/2013 | Hogasten | ........... | H04N 5/23229 348/164 |
| 8,619,082 B1* | 12/2013 | Ciurea | ................... | G06T 15/20 345/427 |
| 8,860,868 B2* | 10/2014 | Dahlgren | .......... | H01L 27/14609 348/335 |
| 8,908,013 B2* | 12/2014 | Imai | ....................... | H04N 5/232 348/47 |
| 9,117,271 B2* | 8/2015 | Habuka | .................. | G06T 5/003 |
| 9,143,704 B2* | 9/2015 | Lin | ........................ | H04N 5/332 |
| 9,143,740 B2* | 9/2015 | Hansen | .................... | H04N 7/18 |
| 9,215,384 B2* | 12/2015 | Hogasten | ................ | G06T 5/008 |
| 9,557,741 B1* | 1/2017 | Elie | ..................... | G06F 16/5854 |
| 9,561,769 B2* | 2/2017 | Himel | ................ | B60R 21/01538 |
| 9,712,755 B2* | 7/2017 | Nishiyama | ............. | G06T 5/003 |
| 9,769,358 B2* | 9/2017 | Higaki | .............. | H04N 5/23235 |
| 10,002,412 B2* | 6/2018 | Park | ........................ | G06T 5/003 |
| 2006/0018513 A1* | 1/2006 | Sogawa | .................... | B60R 1/00 382/106 |
| 2007/0177819 A1* | 8/2007 | Ma | ....................... | G06K 9/00771 382/284 |
| 2007/0230944 A1* | 10/2007 | Georgiev | ............ | H04N 5/23212 396/322 |
| 2010/0067823 A1 | 3/2010 | Kopf et al. | | |
| 2010/0106356 A1* | 4/2010 | Trepagnier | ........... | G05D 1/0248 701/25 |
| 2010/0141802 A1* | 6/2010 | Knight | .................. | H04N 5/2254 348/240.3 |
| 2010/0245634 A1* | 9/2010 | Ahdoot | .................... | H04N 5/33 348/250 |
| 2011/0063451 A1* | 3/2011 | Kamon | ................. | H04N 5/2353 348/164 |
| 2011/0243430 A1* | 10/2011 | Hung | ..................... | H04N 1/486 382/162 |
| 2011/0293179 A1* | 12/2011 | Dikmen | .................. | G06T 5/008 382/167 |
| 2012/0019703 A1* | 1/2012 | Thorn | ..................... | G06T 5/002 348/333.03 |
| 2012/0200829 A1* | 8/2012 | Bronstein | ............ | H04N 5/2254 353/7 |
| 2012/0287249 A1* | 11/2012 | Choo | .................... | H04N 5/2258 348/47 |
| 2013/0222369 A1* | 8/2013 | Huston | ................... | G06T 17/00 345/419 |
| 2013/0229513 A1* | 9/2013 | Ichitani | .............. | G02B 27/1066 348/135 |
| 2013/0329124 A1 | 12/2013 | Nagamatsu | | |
| 2014/0029850 A1* | 1/2014 | Meyers | ..................... | G06T 5/50 382/167 |
| 2014/0063332 A1 | 3/2014 | Miyawaki | | |
| 2014/0071131 A1* | 3/2014 | Kitago | ................. | H04N 13/111 345/427 |
| 2014/0168415 A1* | 6/2014 | Ihlenburg | ................ | B60R 11/04 348/118 |
| 2014/0267633 A1 | 9/2014 | Venkataraman et al. | | |
| 2014/0288782 A1* | 9/2014 | Himel | ............... | B60R 21/01538 701/45 |
| 2014/0303829 A1* | 10/2014 | Lombrozo | ............ | B60W 30/16 701/23 |
| 2014/0307056 A1* | 10/2014 | Collet Romea | ......... | G06T 7/194 348/47 |
| 2014/0327736 A1* | 11/2014 | DeJohn | ............. | H04N 13/0022 348/43 |
| 2014/0375539 A1* | 12/2014 | Gabara | ................. | G06F 3/0304 345/156 |
| 2015/0075066 A1* | 3/2015 | Stowe | .................. | A01D 34/015 47/1.3 |
| 2015/0077522 A1* | 3/2015 | Suzuki | ................. | G02B 3/0037 348/48 |
| 2015/0312541 A1* | 10/2015 | Usui | ..................... | H04N 9/045 348/164 |
| 2016/0093034 A1* | 3/2016 | Beck | ......................... | G06T 5/50 345/617 |
| 2016/0099429 A1* | 4/2016 | Bruder | .................... | G01S 17/06 348/374 |
| 2016/0173748 A1* | 6/2016 | Oba | ..................... | H04N 5/2254 348/148 |
| 2017/0163954 A1* | 6/2017 | Sato | ......................... | H04N 9/07 |
| 2017/0287190 A1* | 10/2017 | Lin | .......................... | G06T 5/50 |

FOREIGN PATENT DOCUMENTS

| | | | |
|---|---|---|---|
| DE | 102012105436 A1 * | 12/2013 | ............ G06T 7/557 |
| DE | 102014218027 A1 * | 6/2015 | .............. B60R 1/00 |
| WO | 2013/181631 A2 | 12/2013 | |
| WO | WO-2014048831 A1 * | 4/2014 | ........... G01B 11/002 |

OTHER PUBLICATIONS

Written Opinion of the International Searching Authority issued in PCT/EP2015/074227 dated Jul. 15, 2016 (12 pages).

* cited by examiner

METHOD FOR PROVIDING IMAGE DATA FROM A CAMERA SYSTEM, CAMERA SYSTEM AND MOTOR VEHICLE

The invention relates to a method for providing image data from a camera system for a motor vehicle, wherein the camera system includes at least one camera, in particular a plenoptic camera, with a lens and a sensor array, in which electromagnetic radiation is captured by means of the sensor array and image data of an environmental region of the motor vehicle is provided based on the captured electromagnetic radiation and the image data is evaluated by means of an evaluation device. In addition, the invention relates to a camera system for motor vehicle as well as to a motor vehicle with a camera system.

It is an object of the invention to provide a method, a camera system as well as a motor vehicle, by which image data particularly rich in information can be provided.

According to the invention, this object is solved by a method, by a camera system as well as by a motor vehicle having the features according to the respective independent claims.

A method according to the invention provides image data from a camera system for a motor vehicle. The camera system has at least one camera, which includes a lens and a sensor array. In particular, the camera is formed as a plenoptic camera. Electromagnetic radiation is captured by means of the sensor array and image data of an environmental region of the motor vehicle is provided based on the captured electromagnetic radiation. In addition, the image data is evaluated by means of an evaluation device. An essential feature of the invention is in that a direction of incidence of the electromagnetic radiation on the sensor array is determined by the evaluation device based on the image data provided by the sensor array, and the image data is adapted depending on the determined direction of incidence by means of the evaluation device.

By the method according to the invention, thus, it becomes possible to adapt or improve the image data based on the direction of incidence of the electromagnetic radiation on the sensor array. The direction of incidence of the electromagnetic radiation can in particular be determined by means of the plenoptic camera. The plenoptic camera or light field camera can capture a 4D light field of the environmental region. In contrast to the plenoptic camera, a conventional camera only captures a 2D image. In the 4D light field, not only the position and the intensity of a light beam on a sensor of the sensor array are known, but also the direction, from which this light beam has been incident. The capture of the 4D light field becomes possible by a grid of multiple microlenses in front of the sensor. Thus, the lens of the camera is formed as a microlens. The particular capabilities of the plenoptic camera are in that the maximum depth of focus is very high and a focusing operation does not have to be awaited. In addition, the focal plane of a captured image of the image data can be adapted afterwards. Depth information can also be determined from the image data such that the plenoptic camera is also suitable as a 3D camera. With the image data, then, subsequent depth of focus extension (focus stacking) is also possible. Furthermore, it is advantageous that the image data can be particularly effectively adapted or improved depending on the 4D light field and a high-quality image of the image data can be provided of the environmental region.

In particular, it is provided that hazy and/or misty areas of the image data are adapted depending on the determined direction of incidence. The image data can for example have the hazy and/or the misty areas due to Rayleigh scattering. The Rayleigh scattering denotes an elastic scattering of electromagnetic waves on particles, the diameter of which is small compared to the wavelength—as in scattering of light on small molecules. The Rayleigh scattering occurs since incident light excites electrons of a molecule and induces a dipole moment, which oscillates like the incident light or like the incident electromagnetic radiation. Now, the induced dipole moment acts like a Hertzian dipole and emits light, which has the same wavelength as the incident light. The advantage is that the direction of incidence of the electromagnetic radiation or the 4D light field can be used to particularly effectively remove the Rayleigh scattering from the image data or to suppress or minimize it in the image data. For example, this can be effected because the depth value of an image of the image data can be determined by the 4D light field and thus the adaptation or the correction is only applied in the image, where the depth value is indicative of a certain distance, for example a distance of 100 meters or more, between the camera system and an object in the environmental region. Thus, it can be assumed that the Rayleigh scattering or the misty area occurs in the image only where the depth value is 100 meters or more. Areas of the image, which are closer than 100 meters, can be excluded from the adaptation in order not to erroneously adapt areas of the image not affected by the Rayleigh scattering. The range above 100 meters is particularly interesting with respect to the recognition and/or warning of cross-traffic and/or for general object recognition. Furthermore, details of the image data are withheld from an observer of the image data due to the Rayleigh scattering and/or a clarity of objects in the image data is reduced. By reducing the Rayleigh scattering in the image data, thus, the safety of the motor vehicle can be increased.

Preferably, it is provided that the sensor array includes a first sensor and at least one further sensor, wherein first sensor data from an infrared wavelength range of the electromagnetic radiation is captured with the first sensor and the image data is additionally adapted depending on the first sensor data. By the capability of the first sensor to capture the infrared wavelength range, the plenoptic camera can provide additional information about the infrared wavelength range. Thus, the environmental region is particularly exactly described by the image data. Furthermore, the image data can be particularly precisely adapted with respect to the hazy and/or misty areas and/or the Rayleigh scattering based on the first sensor data.

Furthermore, it is provided that a near infrared range of the electromagnetic radiation is captured as the infrared wavelength range. The near infrared range in particular extends between a wavelength of 780 nanometers and 3.0 micrometers. The near infrared range can be further divided into an IR-A range and an IR-B range. The IR-A range extends from 0.78 micrometers to 1.4 micrometers, while the IR-B range extends from 1.4 micrometers to 3.0 micrometers. It is advantageous in the capture of the near infrared range, in particular the IR-A range, that this information can be provided by means of a sensor manufactured of silicon. Thus, a conventional CCD or CMOS sensor of a camera can for example be used.

Furthermore, it is provided that the camera system has at least two cameras and a baseline describing a distance between the at least two cameras is respectively determined, and the image data is adapted depending on the determined baseline. The knowledge about the exact distance between the two cameras enables a stereo principle of the camera system. Thus, the image data of the at least two cameras can be related to each other. Depending on the baseline, a parallax of the camera system is also known. The parallax is defined as an angle between two straight lines, which are directed from different locations, thus the beginning and the end of the baseline, to the same point, for example an object in the environmental region. The parallax is also the angle, at which the baseline appears from the object.

Preferably, it is provided that an image depth value of the image data is determined based on the baseline, by which a distance to an object in the environmental region is described. By the image depth value, it can be determined at each location in the image data how far the object is away from the camera. This is advantageous in that the image data now can be adapted depending on the image depth value. The adaptation or improvement of the image data with respect to the hazy and/or the misty areas and/or the Rayleigh scattering can now be performed such that areas in the image data having a great image depth value are adapted, while areas in the image data having a low image depth value are excluded from the adaptation. The reason is that the misty area and/or the Rayleigh scattering mostly occur only from a certain distance or range, in particular from 100 meters and more. With the knowledge about the distance of the object to the camera, thus, areas of the image data can be excluded from the adaptation, which are near the camera and thus would be erroneously adapted. The quality of the adapted image data can therefore be increased depending on the image depth value.

In particular, it is provided that further sensor data in the visible wavelength range of the electromagnetic radiation is captured with the at least one further sensor. The visible wavelength range extends from approximately 380 nanometers to 780 nanometers of the electromagnetic spectrum. The at least one further sensor can be sensitive to a red range of the visible wavelength range and/or a green range of the visible wavelength range and/or a blue range of the visible wavelength range. Thus, a color image can for example be provided thereby. Thus, it is possible to consider the direction of incidence of the electromagnetic radiation and/or the image depth value and/or the first sensor data from the infrared wavelength range and/or the further sensor data from the visible wavelength range. Thus, a plurality of information in the image data and therefore the possibility of particularly precisely adapting the image data are advantageous.

Furthermore, it is provided that the image data is adapted depending on at least a first approximation image provided by low-pass filtering of the first sensor data and/or on at least a second approximation image provided by low-pass filtering of the further sensor data. The first approximation image and/or the at least one second approximation image can be provided by removing the high frequencies in image data. Depending on the first approximation image and/or the at least one further approximation image or second approximation image, the image data can be particularly precisely adapted, in particular the hazy and/or the misty areas and/or the Rayleigh scattering can be particularly precisely removed from the image data.

Furthermore, it is provided that a first contrast image determining a foreground of the first approximation image and/or a background of the first approximation image is provided based on the first approximation image, and/or a second contrast image determining a foreground of the second approximation image and/or a background of the second approximation image is provided based on the second approximation image. The first contrast image and/or the second contrast image can for example be provided according to a method of A. Toet, Hierarchical image fusion, Machine Vision and Applications, volume 3, number 1, pages 1 to 11, 1990. It is advantageous in the first contrast image and/or the second contrast image that the image data can be particularly precisely adapted depending thereon. Thus, the hazy and/or the misty area and/or the Rayleigh scattering can be particularly precisely removed from the image data depending on the first contrast image and/or the second contrast image.

Furthermore, it is preferably provided that the first approximation image and/or the second approximation image and/or the first contrast image and/or the second contrast image are provided in different resolutions. Based on the different resolutions, the first contrast image and the second contrast image can be used to provide qualitatively particularly high-class adapted image data. The idea behind this is that the first sensor data from the infrared wavelength range has a higher contrast in the case of the hazy and/or the misty area than the further sensor data providing the color information from the visible wavelength range. By a fusion of the first and the second sensor data depending on the first approximation image and/or the second approximation image and/or the first contrast image and/or the second contrast image in different resolutions, the image data can be particularly precisely adapted.

In a further development, it is provided that the image data is adapted depending on a current position of the camera system, in particular a GNSS position. The GNSS position can for example be provided by means of a GPS receiver and/or a GLONASS receiver and/or a Galileo receiver. The current position can then be used to examine if the environmental region shows a situation, which has the hazy and/or the misty areas and/or the Rayleigh scattering, or if it is for example a monochromatic blue object in the environmental region, which then would be erroneously adapted. Thus, the current position is also considered to decide whether or not the adaptation of the image data is reasonable.

Furthermore, it is preferably provided that a current distance between the camera system and an object in the environmental region is determined by means of a distance sensor and the image data is adapted depending on the determined distance. The distance sensor can for example be a radar sensor and/or an ultrasonic sensor and/or a lidar sensor and/or a laser scanner. Depending on the determined distance to objects in the image data, it can be decided whether or not the adaptation is performed for this area of the image data. Thus, the adaption of areas of the image data, in which near objects are imaged, can be suppressed in order not to erroneously adapt or unnecessarily adapt the image data in this area. On the other hand, with a sight across an open space, mist and/or the Rayleigh scattering can be assumed with a higher probability. Thus, the possibility of particularly precisely adapting the image data is advantageous.

The invention also relates to a camera system for a motor vehicle including at least one camera, which includes a lens and a sensor array for capturing electromagnetic radiation and for providing image data of an environmental region of the motor vehicle based on the captured electromagnetic radiation, and including an evaluation device for evaluating the image data, wherein the evaluation device is adapted to perform a method according to the invention.

In particular, it is provided that the lens is formed as a microlens array. The microlens array is an assembly of lenses, which can be both rotationally symmetrical and cylindrical. The lenses of the microlens array are disposed with a clearance as low as possible or no clearance. The plenoptic camera can be provided by the microlens array. A direction of incidence of the electromagnetic radiation to the sensor array can be determined by the plenoptic camera. It is advantageous that the image data can be provided with particularly extensive information.

The invention also includes a motor vehicle with a camera system according to the invention or an advantageous implementation thereof. The motor vehicle is in particular formed as a passenger car.

The preferred embodiments presented with respect to the method according to the invention and the advantages thereof correspondingly apply to the camera system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures and explained, but arise from and can be generated by separated feature combinations from the explained implementations.

Below, embodiments of the invention are explained in more detail based on schematic drawings.

Figure 2:
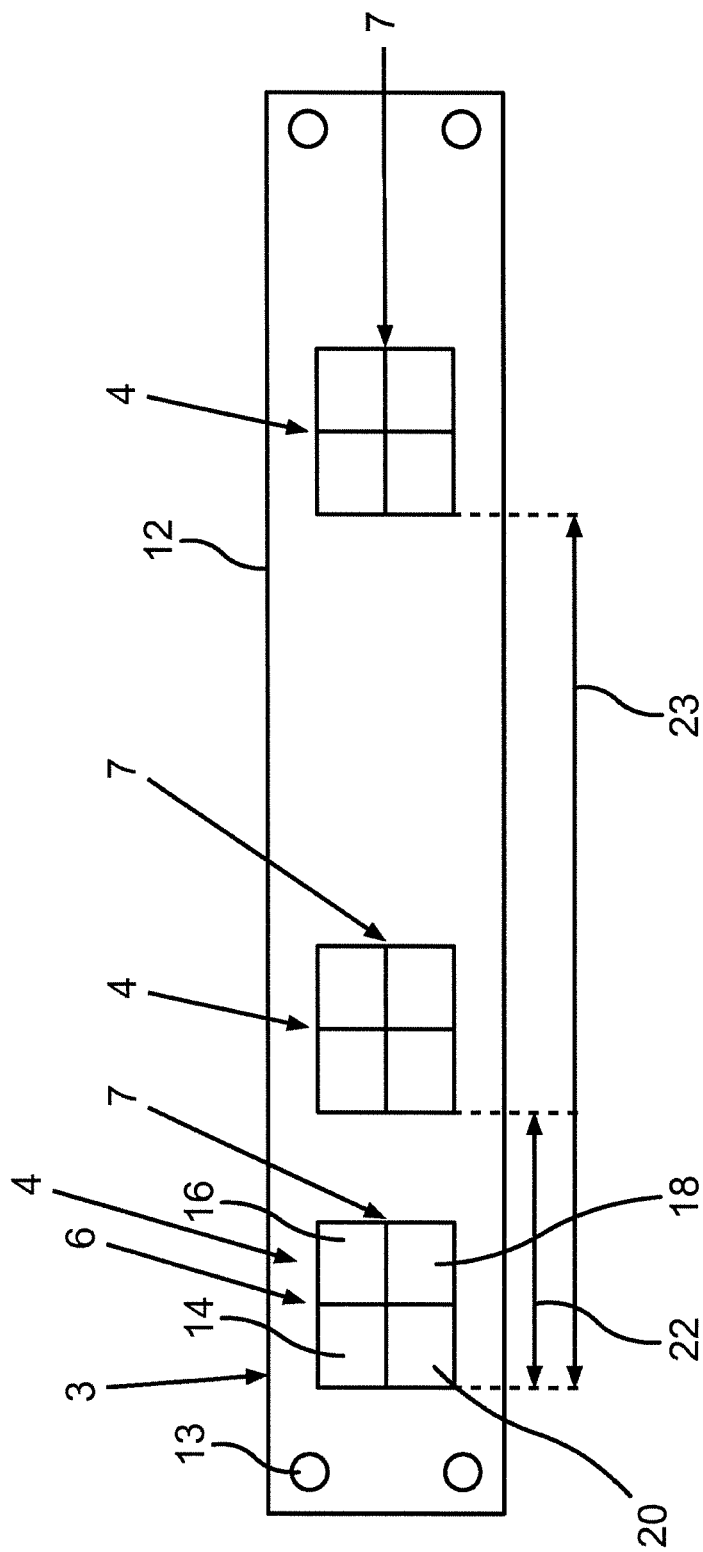
Figure 3:
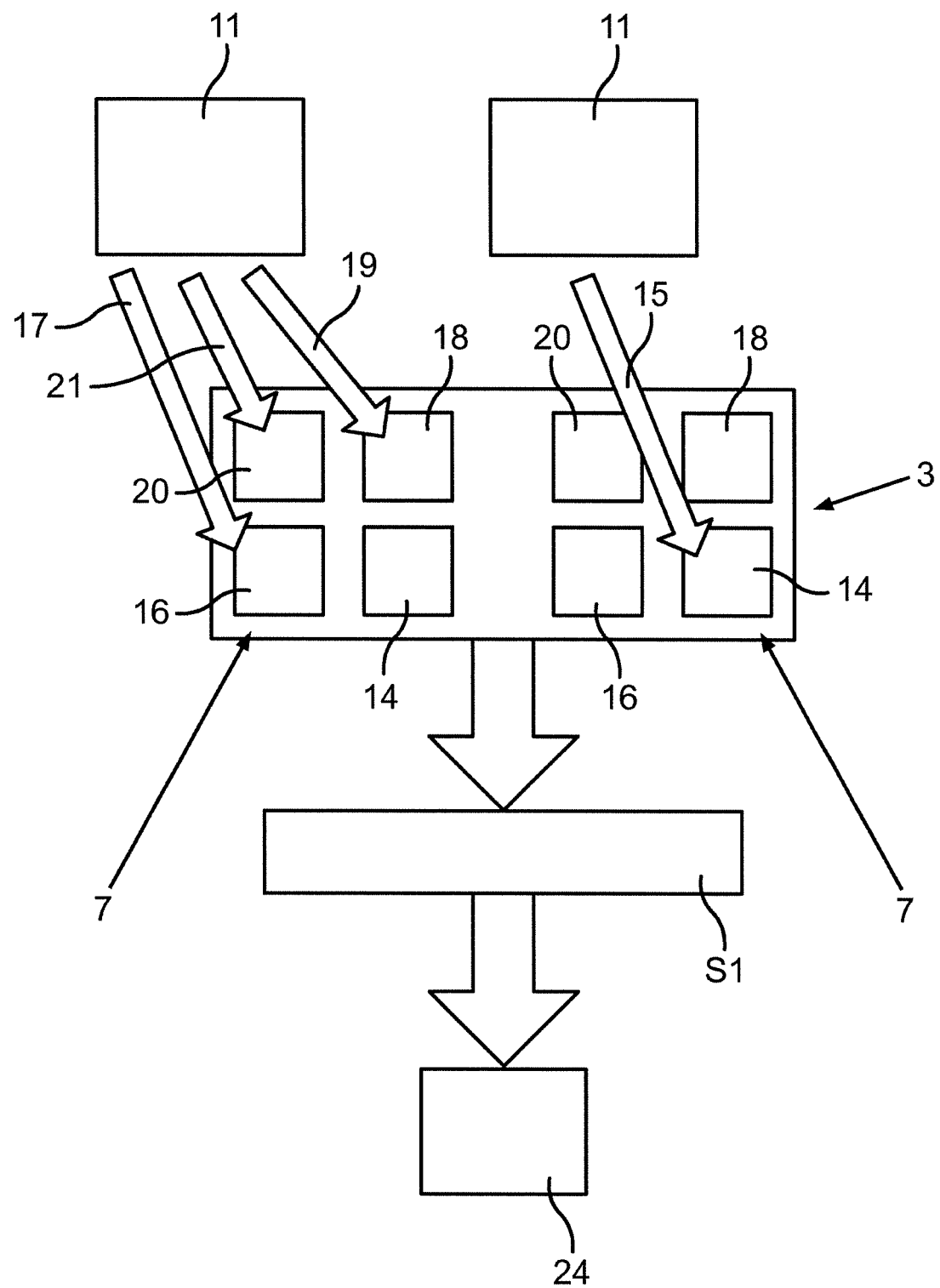

There show:

FIG. 1 in schematic plan view an embodiment of a motor vehicle according to the invention with a driver assistance system including a camera system;

FIG. 2 a schematic illustration of the camera system, which includes at least one sensor array; and FIG. 3 a schematic flow diagram of a method according to the invention with the camera system.

In FIG. 1, a plan view of a motor vehicle 1 with a driver assistance system 2 according to an embodiment of the invention is schematically illustrated. In the embodiment, the driver assistance system 2 includes a camera system 3. The camera system 3 further includes a plenoptic camera 4 and an evaluation device 5.

The plenoptic camera 4 includes a lens 6 and a sensor array 7. According to the embodiment, the lens 6 is a microlens array. The microlens array is an assembly of lenses, which can be both rotationally symmetrical and cylindrical. The lenses are disposed with a clearance as low as possible or no clearance. The dimensions of the individual lenses are between 1 millimeter and few millimeters or below according to application.

The plenoptic camera 4 can provide a spatial image, therefore, the microlens array is employed in an image plane of the plenoptic camera 4. Thereby, besides the two spatial directions (xy coordinates) in the image plane, the direction of an incident light beam can also be determined. Thus, the microlens array provides two angular coordinates based on the direction or the direction of incidence and the spatial directions in the image plane, which constitute the basis for the calculation of a depth map. The plenoptic camera thus mimics the binocular vision of the human eye.

In the embodiment according to FIG. 1, the plenoptic camera 4 is disposed in an area behind a windshield 8 of the motor vehicle 1 and oriented forwards in direction of travel of the motor vehicle 1. However, the arrangement of the plenoptic camera 4 in and/or on the motor vehicle 1 is variously possible, thus, the plenoptic camera 4 can for example also be disposed on a front 9 or a rear 10 or laterally on the motor vehicle 1. Furthermore, multiple plenoptic cameras 4 preferably are for example also provided, which capture an environmental region 11 of the motor vehicle 1.

In the present embodiment, the evaluation device 5 is schematically shown. The evaluation device 5 can also be arbitrarily disposed in the motor vehicle 1. For example, the evaluation device 5 can be constituted by a controller (ECU, electronic control unit) of the motor vehicle 1.

FIG. 2 shows the camera system 3 in a schematic illustration. The camera system 3 usually includes multiple plenoptic cameras 4, wherein three plenoptic cameras 4 are shown according to the embodiment of FIG. 2. Each of the plenoptic cameras 4 includes a sensor array 7. The sensor arrays 7 of the plenoptic cameras 4 are in particular formed identical in construction. Furthermore, the camera system 3 includes a housing 12 and holes 13 for mounting the camera system 3.

The sensor array 7 includes a first sensor 14 for capturing electromagnetic radiation in the infrared wavelength range 15. The first sensor 14 can for example be manufactured from a semiconductor material. The semiconductor material is preferably silicon. If the first sensor 14 is manufactured from silicon, thus, it captures the infrared wavelength range 15 up to 1.0 micrometers of the electromagnetic radiation, thus preferably in the range of the near infrared of the infrared wavelength range 15. Additionally or alternatively, the first sensor 14 can also be formed as a micro-bolometer or microtechnically manufactured bolometer. In this case, the medium and the far range of the infrared wavelength range 15 are substantially captured. The near infrared for example extends from 0.78 micrometers to 3.0 micrometers of wavelength. The medium infrared (MIR) extends for example from 3 micrometers to 50 micrometers of wavelength. The far infrared (FIR) extends for example from 50 micrometers to 1,000 micrometers of wavelength.

Furthermore, it is provided that a second sensor 16 is adapted for capturing the electromagnetic radiation in the blue visible wavelength range 17. A third sensor 18 is adapted to capture the electromagnetic radiation of a green visible wavelength range 19. And further, according to the embodiment, a fourth sensor 20 is adapted to capture the electromagnetic radiation in a red visible wavelength range 21. The sensors 14, 16, 18, 20 can for example be formed as CCD sensors or CMOS sensors. The arrangement of the first sensor 14 and/or of the second sensor 16 and/or of the third sensor 18 and/or of the fourth sensor 20 according to the embodiment 2 is to be merely exemplarily understood. The arrangement of the sensors 14, 16, 18, 20 is arbitrary, however, preferably such that the environmental region 11 can be captured.

Furthermore, a first baseline 22 is known, which describes the distance from the one plenoptic camera 4 to the other plenoptic camera 4. In addition, a second baseline 23 is known, which describes a distance from the one plenoptic camera 4 to the other plenoptic camera 4. Based on the first baseline 22 and/or the second baseline 23, for example, the advantages of a stereo principle can be used with the camera system 3, which allows depth estimation or the determination of a depth value in the image data 24.

FIG. 3 shows, how the electromagnetic radiation of the environmental region 11 is captured and/or provided with the camera system 3. The blue visible wavelength range 17 is captured by the second sensor 16 of the camera system 3. The green visible wavelength range 19 is captured by the third sensor 18 and the red visible wavelength range 21 is captured by the fourth sensor 20. According to the embodiment of FIG. 3, the visible wavelength ranges 17, 19, 21 are received by the sensor array 7, while the infrared wavelength range 15 is received by the first sensor 14 of the sensor array 7. In a step S1, the sensor data of the first sensor 14 and/or of the second sensor 16 and/or of the third sensor 18 and/or of the fourth sensor 20 is merged or fused to image data 24.

Thus, the image data 24 has sensor data from the infrared wavelength range 15 and/or the blue visible wavelength range 17 and/or the green visible wavelength range 19 and/or the red visible wavelength range 21. The portion of the different sensor data in the respective wavelength ranges 15, 17, 19, 21 can now be weighted depending on the characteristics of the environmental region 11. A characteristic of the environmental region 11 can for example be the brightness or the illumination of the environmental region 11. Thus, the image data 24 is composed or fused such that the brightness is taken into account.

Furthermore, it is provided that each of the sensors 14, 16, 18, 20 has an own filter to realize the wavelength range 15, 17, 19, 21 intended for this sensor 14, 16, 18, 20 and to exclude or suppress those wavelength ranges 15, 17, 19, 21, which are not desired. Thus, customary off-the-shelf cameras for example have an infrared blocking filter, which prevents penetration of the electromagnetic radiation of the infrared wavelength range 15 to the respective sensor 16, 18, 20.

Furthermore, it is provided that the portion of the infrared wavelength range in the image data 24 is increased with decreasing brightness and thus higher quality of the image data 24 can be provided. Usually, with decreasing brightness, a sensor has the possibility to compensate for this via a gain of the signal. This can be effected by an automatic gain control (AGC) and/or an automatic exposure control (AEC). It is the aim to provide an optimally exposed image or optimally exposed image data 24. To this, either an exposure time of the sensor 14, 16, 18, 20 can be increased or additionally or alternatively a signal of the sensor 14, 16, 18, 20 can be electronically amplified. Thus, based on the automatic gain control, it can be determined if the brightness in the environmental region 11 increases or decreases. Depending on that, now, the portion of the infrared wavelength range 15 in the image data 24 can also be controlled. Thus, it is provided that this portion of the infrared wavelength range 15 in the image data 24 increases with low brightness or decreasing brightness and decreases with increasing brightness or high brightness. This can be mathematically described as follows:

Image data 24=$f((g*IR)+(1-g)*C)$, wherein f is a function for generating the image data 24, g is a parameter of the automatic gain control, IR is first sensor data of the first sensor 14 from the infrared wavelength range 15 and C is further sensor data of the second sensor 16 and/or of the third sensor 18 and/or of the fourth sensor 20 from the visible wavelength range 17, 19, 21.

In a further embodiment, based on the image data 24 including the information of the 4D light field from the plenoptic camera and/or the first sensor data IR and/or the further sensor data C, a topography of a road in the environmental region 11 can be inferred. The topology of the road, thus for example potholes, contaminations and/or other conditions of the surface of the road, can be used for the driver assistance system 2 to control a chassis regulation of the motor vehicle 1 and/or an evasive maneuver of the motor vehicle 1.

Hazy and/or misty areas in the image data 24 and/or Rayleigh scattering can be removed or suppressed by the following adaptation of the image data 24. The first sensor data IR from the infrared wavelength range 15 is fused with the further sensor data C from the visible wavelength range 17, 19, 21. To this, the further sensor data C is transformed into a luminance-chrominance color space. Thus, a luminance image $V_0$ of the visible wavelength range 17, 19, 21 can be provided. Furthermore, a NIR image $N_0$ of the first sensor data IR can be provided. The luminance image $V_0$ and the NIR image $N_0$ are the input to the method for adapting the image data 24 or for the fusion of the image data 24. The output of the method is a fused luminance image $F_0$. The chrominance information of the further sensor data C is not used during the fusion, but is simply combined with the fused luminance image $F_0$ after fusion.

Different resolutions are provided by the luminance image $F_0$ and the NIR image $N_0$. To this, first, an approximation image $V_{k+1}^a$ of the luminance image $V_0$ is provided and an approximation image $N_{k+1}^a$ of the NIR image $N_0$ is provided.

$$V_{k+1}^a = W_{\lambda_0 c^k}(V_0) \tag{1a}$$

$$N_{k+1}^a = W_{\lambda_0 c^k}(N_0) \tag{1b}$$

W corresponds to a WLS filter as it was presented by Z. Farbmann, R. Fattal, D. Lischinski and R. Szeliski in the conference paper "Edge-preserving decompositions for multi-scale tone and detail manipulation" of the International Conference on Computer Graphics and Interactive Techniques, page 1 to 10, 2008. The parameter $\lambda_0$ controls the coarseness of the respective approximation image $V_{k+1}^a$, $N_{k+1}^a$ at the respective resolution step or the respective layer k+1. The parameter $\lambda_0$ expresses the degree of coarseness of the first approximation image, while the further approximation images are coarser by a multiple of c. Thus, for example $\lambda_0=0.1$ and c=2, while a resolution step, thus an overall number of layers, is set to n=6.

Finally, contrast images are determined. A contrast image $V_k^d$ of the further sensor data and a contrast image $N_k^d$ of the first sensor data. The contrast images are determined according to an approach of A. Toet, which describes a method for calculating the contrast images $V_k^d$, $N_k^d$ in an article Hierarchical Image Fusion in Machine Vision and Applications, volume 3 number 1, pages 1 to 11, 1990. This can be mathematically expressed as follows:

$$V_k^d = \frac{V_{k-1}^a - V_k^a}{V_k^a} \tag{2a}$$

$$N_k^d = \frac{N_{k-1}^a - N_k^a}{N_k^a} \tag{2b}$$

The contrast images $V_k^d$ $N_k^d$ and the approximation images $V_{k+1}^a$ $N_{k+1}^a$ are represented in different resolutions of the n layers. A basic criterion of the fused luminance image $F_0$ is that the NIR image $N_0$ has a higher contrast if mist and/or a hazy area and/or Rayleigh scattering are present. Therefore, the maximum of the respective contrast image $V_k^d$, $N_k^d$ is used for the fused luminance image $F_0$. Furthermore, the low-frequency luminance information or color information of the approximation image $V_n^a$ of the visible wavelength range 17, 19, 21 is used. The fused luminance image $F_0$ can now be determined as follows:

$$F_0 = V_n^a \prod_{k=1}^{n} (\max(V_k^d, N_k^d) + 1) \qquad (3)$$

Thus, the fused luminance image $F_0$ is now adapted such that the hazy areas and/or the misty areas and/or the Rayleigh scattering in the image data 24 are reduced.

Furthermore, it is provided that the adaptation of the image data 24 is effected depending on a current distance between the camera system 3 and the object in the environmental region 11. The current distance is provided by means of a distance sensor of the motor vehicle 1. The distance sensor can for example be a radar sensor and/or an ultrasonic sensor and/or a lidar sensor and/or a laser scanner.

Additionally or alternatively, the fused luminance image $F_0$, thus the adaptation of the image data 24, is performed depending on a current position of the camera system 3. The current position can for example be a position, which has been determined by means of a GNSS receiver. The GNSS receiver can for example be a GPS receiver and/or a GLONASS receiver and/or a Galileo receiver and/or a Baidou receiver. The current position can then be used to examine if the environmental region 11 extends across a free open space or if the objects in the environmental region 11 are disposed near the camera system 3, thus for example closer than 100 meters to the camera system 3, and thus occurrence of the hazy and/or the misty areas and/or the areas with Rayleigh scattering is unlikely or can be excluded.

This invention claimed is:

1. A method for providing image data from a camera system for a motor vehicle, the method comprising:
   capturing electromagnetic radiation by a sensor array;
   capturing first sensor data from an infrared wavelength range of an electromagnetic radiation by a first sensor of the sensor array;
   capturing further sensor data in a visible wavelength range of the electromagnetic radiation by a second sensor of the sensor array;
   providing image data of an environmental region of the motor vehicle based on the electromagnetic radiation captured from the first sensor and the second sensor;
   evaluating the image data by an evaluation device;
   determining a direction of incidence of the electromagnetic radiation on the sensor array by the evaluation device based on the image data provided by the sensor array; and
   adapting the image data by the evaluation device based on the determined direction of incidence; and
   adapting the image data based on at least a first approximation image provided by low-pass filtering of first sensor data, and/or adapting the image data based on at least a second approximation image provided by low-pass filtering of the further sensor data; and
   weighting portions of the sensor data in the respective infrared wavelength range and visible wavelength range based on brightness of the environmental region to obtain optimally exposed image data, wherein the portion of the infrared wavelength range in the image data is increased with decreasing brightness of the environmental region and decreased with increasing brightness of the environmental region,
   wherein the image data is additionally adapted depending on the first sensor data,
   wherein the camera system comprises a single plenoptic camera that comprises a lens and the sensor array,
   wherein the sensor array comprises the first sensor and the second sensor,
   and wherein the camera system is mounted on the vehicle,
   wherein the portion of the infrared wavelength range in the image data is increased with decreasing brightness of the environmental region and decrease with increasing brightness of the environmental region in accordance with the equation:

Image data=$f((g*IR)+(1-g)*C)$, and wherein f is a function for generating the image data, g is a parameter of an automatic gain control, IR is first sensor data of the first sensor from the infrared wavelength range and C is further sensor data from other sensors from the visible wavelength range.

2. The method according to claim 1, wherein hazy and/or misty areas of the image data are adapted depending on the determined direction of incidence.

3. The method according to claim 1, wherein a near infrared range of the electromagnetic radiation is captured as the infrared wavelength range.

4. The method according to claim 1, wherein the camera system has at least two cameras, the method further comprising:
   determining a baseline describing a distance between the at least two cameras; and
   adapting the image data depending on the determined baseline.

5. The method according to claim 4, wherein an image depth value of the image data is determined based on the baseline, by which a distance to an object in the environmental region is described.

6. The method according to claim 5, wherein:
   a first contrast image determining a foreground of the first approximation image is provided based on the first approximation image,
   a first contrast image determining a background of the first approximation image is provided based on the first approximation image,
   a second contrast image describing a foreground of the second approximation image is provided based on the second approximation image, or
   a second contrast image describing a background of the second approximation image is provided based on the second approximation image.

7. The method according to claim 6, wherein at least one selected from a group consisting of: the first approximation image, the second approximation image, the first contrast image, and the second contrast image is/are provided in different resolutions.

8. The method according to claim 1, wherein the image data is adapted depending on a current GNSS position of the camera system.

9. The method according to claim 1, further comprising
   determining a current distance between the camera system and an object in the environmental region; and
   adapting the image data depending on the determined distance.

10. A camera system for a motor vehicle comprising:
    a single plenoptic camera that comprises a lens and a sensor array for capturing electromagnetic radiation and for providing image data of an environmental region of the motor vehicle based on the captured electromagnetic radiation from a first sensor and at least one second sensor; and
    an evaluation device that evaluates the image data,
    wherein the camera system is mounted on the vehicle;

wherein the sensor array comprises the first sensor and the at least one second sensor;

wherein the first sensor captures first sensor data from an infrared wavelength range of the electromagnetic radiation;

wherein the at least one second sensor captures further sensor data in a visible wavelength range of the electromagnetic radiation; and wherein the evaluation device:
evaluates the image data,
determines a direction of incidence of the electromagnetic radiation on the sensor array based on the image data provided by the sensor array,
adapts the image data based on the determined direction of incidence,
adapts the image data based on at least a first approximation image provided by low-pass filtering of first sensor data, and/or adapts the image data based on at least a second approximation image provided by low-pass filtering of the further sensor data,
adapts the image data based on the first sensor data, and
weighs portions of the sensor data in the respective infrared wavelength range and visible wavelength range based on brightness of the environmental region to obtain optimally exposed image data, wherein the portion of the infrared wavelength range in the image data is increased with decreasing brightness of the environmental region and decreased with increasing brightness of the environmental region,
wherein the portion of the infrared wavelength range in the image data is increased with decreasing brightness of the environmental region and decrease with increasing brightness of the environmental region in accordance with the equation:

$$\text{Image data} = f((g*IR) + (1-g)*C), \text{ and}$$

wherein f is a function for generating the image data, g is a parameter of an automatic gain control, IR is first sensor data of the first sensor from the infrared wavelength range and C is further sensor data from other sensors from the visible wavelength range.

11. The camera system according to claim 10, wherein the lens is formed as a microlens array.

12. A motor vehicle comprising a camera system, the camera system being mounted on the motor vehicle the camera system comprises:
a single plenoptic camera that comprises a lens and a sensor array for capturing electromagnetic radiation and for providing image data of an environmental region of the motor vehicle based on the captured electromagnetic radiation from a first sensor and at least one second sensor; and
an evaluation device that evaluates the image data,
wherein the sensor array comprises a first sensor and at least one second sensor;
wherein the first sensor captures first sensor data from an infrared wavelength range of the electromagnetic radiation;
wherein the at least one second sensor captures further sensor data in a visible wavelength range of the electromagnetic radiation; and
wherein the evaluation device:
evaluates the image data,
determines a direction of incidence of the electromagnetic radiation on the sensor array based on the image data provided by the sensor array,
adapts the image data based on the determined direction of incidence,
adapts the image data based on at least a first approximation image provided by low-pass filtering of first sensor data, and/or adapts the image data based on at least a second approximation image provided by low-pass filtering of the further sensor data, and
adapts the image data based on the first sensor data, and
weighs portions of the sensor data in the respective infrared wavelength range and visible wavelength range based on brightness of the environmental region to obtain optimally exposed image data, wherein the portion of the infrared wavelength range in the image data is increased with decreasing brightness of the environmental region and decreased with increasing brightness of the environmental region,
wherein the portion of the infrared wavelength range in the image data is increased with decreasing brightness of the environmental region and decrease with increasing brightness of the environmental region in accordance with the equation:

$$\text{Image data} = f((g*IR) + (1-g)*C), \text{ and}$$

wherein f is a function for generating the image data, g is a parameter of an automatic gain control, IR is first sensor data of the first sensor from the infrared wavelength range and C is further sensor data from other sensors from the visible wavelength range.

* * * * *